(12) United States Patent
Sattinger et al.

(10) Patent No.: US 9,843,211 B2
(45) Date of Patent: Dec. 12, 2017

(54) MULTIPLE POWER CHARGERS FOR MOBILE TERMINALS

(71) Applicant: QUALCOMM Incorporated, San Diego, CA (US)

(72) Inventors: Arnon Sattinger, Zichron Yaakov (IL); Shadi Hawawini, Mountain View, CA (US); Amit Mano, Haifa (IL); Christian Gregory Sporck, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 14/858,324

(22) Filed: Sep. 18, 2015

(65) Prior Publication Data

US 2016/0087472 A1    Mar. 24, 2016

Related U.S. Application Data

(60) Provisional application No. 62/053,303, filed on Sep. 22, 2014.

(51) Int. Cl.
| | |
|---|---|
| *H02J 7/00* | (2006.01) |
| *H02J 7/02* | (2016.01) |
| *H02J 50/10* | (2016.01) |

(52) U.S. Cl.
CPC ............ *H02J 7/022* (2013.01); *H02J 7/0055* (2013.01); *H02J 50/10* (2016.02); *H02J 2007/0059* (2013.01); *H02J 2007/0062* (2013.01)

(58) Field of Classification Search
CPC ....... H02J 2007/0059; H02J 2007/0062; H02J 50/10; H02J 7/0055; H02J 7/022
See application file for complete search history.

(56) References Cited

U.S. PATENT DOCUMENTS

| | | |
|---|---|---|
| 7,432,685 B2 | 10/2008 | Hayashi |
| 7,688,037 B2 | 3/2010 | Huh |

(Continued)

FOREIGN PATENT DOCUMENTS

EP          2424067 A1    2/2012

OTHER PUBLICATIONS

Second Written Opinion for PCT/US2015/051197, dated Sep. 16, 2016, 5 pages.

(Continued)

*Primary Examiner* — Vuthe Siek
(74) *Attorney, Agent, or Firm* — W&T/Qualcomm

(57) ABSTRACT

Multiple power chargers for mobile terminals are disclosed. In particularly contemplated aspects, a mobile terminal may include two charging circuits arranged serially, such that only one charging circuit charges a battery of the mobile terminal at a time. The serial arrangement allows consolidation of fuel gauge circuitry within one of the charging circuits. In a particularly contemplated aspect, a second charger is tied to a first charger at a system power node. The system power node is further tied to a top port of the second charger. A bottom port of the second charger is tied to a top port of the first charger. A bottom port of the first charger is tied to the battery of the mobile terminal. The fuel gauge circuitry may sense battery current using a known ON resistance of a field effect transistor (FET) of the first charger.

14 Claims, 8 Drawing Sheets

(56) References Cited

U.S. PATENT DOCUMENTS

| | | | |
|---|---|---|---|
| 8,395,348 B1 | 3/2013 | Saatchi et al. | |
| 2009/0322287 A1* | 12/2009 | Ozeki | H02J 7/0018 |
| | | | 320/145 |
| 2011/0302441 A1* | 12/2011 | Sawyers | G06F 1/28 |
| | | | 713/340 |
| 2013/0154550 A1 | 6/2013 | Balmefrezol et al. | |
| 2014/0266011 A1 | 9/2014 | Mehta et al. | |
| 2014/0347003 A1 | 11/2014 | Sporck et al. | |

OTHER PUBLICATIONS

International Preliminary Report on Patentability for PCT/US2015/051197, dated Dec. 15, 2016, 20 pages.
International Search Report and Written Opinion for PCT/US2015/051197, dated Nov. 23, 2015, 12 pages.

\* cited by examiner

MULTIPLE POWER CHARGERS FOR MOBILE TERMINALS

PRIORITY CLAIM

The present application claims priority to U.S. Provisional Patent Application Ser. No. 62/053,303, filed on Sep. 22, 2014, and entitled "MULTIPLE POWER CHARGERS FOR MOBILE TERMINALS," which is incorporated by reference in its entirety.

BACKGROUND

I. Field of the Disclosure

The technology of the disclosure relates generally to power charging circuitry for mobile terminals.

II. Background

Computing devices, and particularly mobile computing devices, have become common throughout society. Over one billion mobile computing devices were sold in 2010 with no saturation of demand in sight. Mobile computing devices derive their ability to be mobile through the use of increasingly efficient and small rechargeable battery devices. Such rechargeable battery devices must be recharged from an external power source. The most common such external power source is a wall outlet. However, as the number and variety of computing devices have increased, alternate power sources and power formats have been adopted as viable power sources for mobile computing devices.

An example of such an alternate power source and alternate power format is the use of a computing device to provide power to the mobile computing device through a Universal Serial Bus (USB) cable or USB plug. Still another possible power source is through a wireless interface. Regardless of source, most mobile computing devices require that the battery be recharged using a direct current (DC) voltage provided at a specific current and/or voltage profile. To force compliance with such requirements, a charging circuit may be provided within an integrated circuit (IC) within the mobile computing device. Such charging circuits typically include a buck converter.

As the number of possible power sources increases, designers have contemplated providing dedicated charger circuits for the mobile computing device. Such dedicated charger circuits may consume relatively large volumes within the mobile computing device and impose power penalties. Even if the charger circuit allows for operation with two power sources, there may be other power sources for which a designer desires interoperability. Thus, there needs to be more flexibility in providing charger circuits.

SUMMARY OF THE DISCLOSURE

Aspects disclosed in the detailed description include multiple power chargers for mobile terminals. In particularly contemplated aspects, a mobile terminal may include two charging circuits arranged serially, such that only one charging circuit charges a battery of the mobile terminal at a time. The serial arrangement allows consolidation of fuel gauge circuitry within one of the charging circuits. In a particularly contemplated aspect, a second charger is tied to a first charger at a system power node. The system power node is further tied to a top port of the second charger. A bottom port of the second charger is tied to a top port of the first charger. A bottom port of the first charger is tied to the battery of the mobile terminal. The fuel gauge circuitry may sense battery current using a known ON resistance of a field effect transistor (FET) of the first charger.

In this regard in one aspect, a charging system is disclosed. The charging system includes a first charger which further includes a first power output tied to a system power node. The first charger also includes a first top port. The first charger also includes a first bottom port. The first charger further includes a fuel gauge tied to the first top port. The charging system also includes a second charger which further includes a second power output tied to the system power node. The second charger also includes a second top port tied to the system power node. The second charger further includes a second bottom port tied to the first top port of the first charger.

In another aspect, a connection fabric is disclosed. The connection fabric includes a first connection configured to be tied to a first power port on a first charger and a system power node. The connection fabric also includes a second connection configured to be tied to a second power port on a second charger and the system power node. The connection fabric further includes a third connection tied to the system power node and configured to be tied to a second top port of the second charger. The connection fabric also includes a fourth connection configured to be tied to a second bottom port of the second charger and a first top port of the first charger. The connection fabric further includes a fifth connection configured to be tied to a first bottom port of the first charger and a battery.

DETAILED DESCRIPTION

Figure 1:
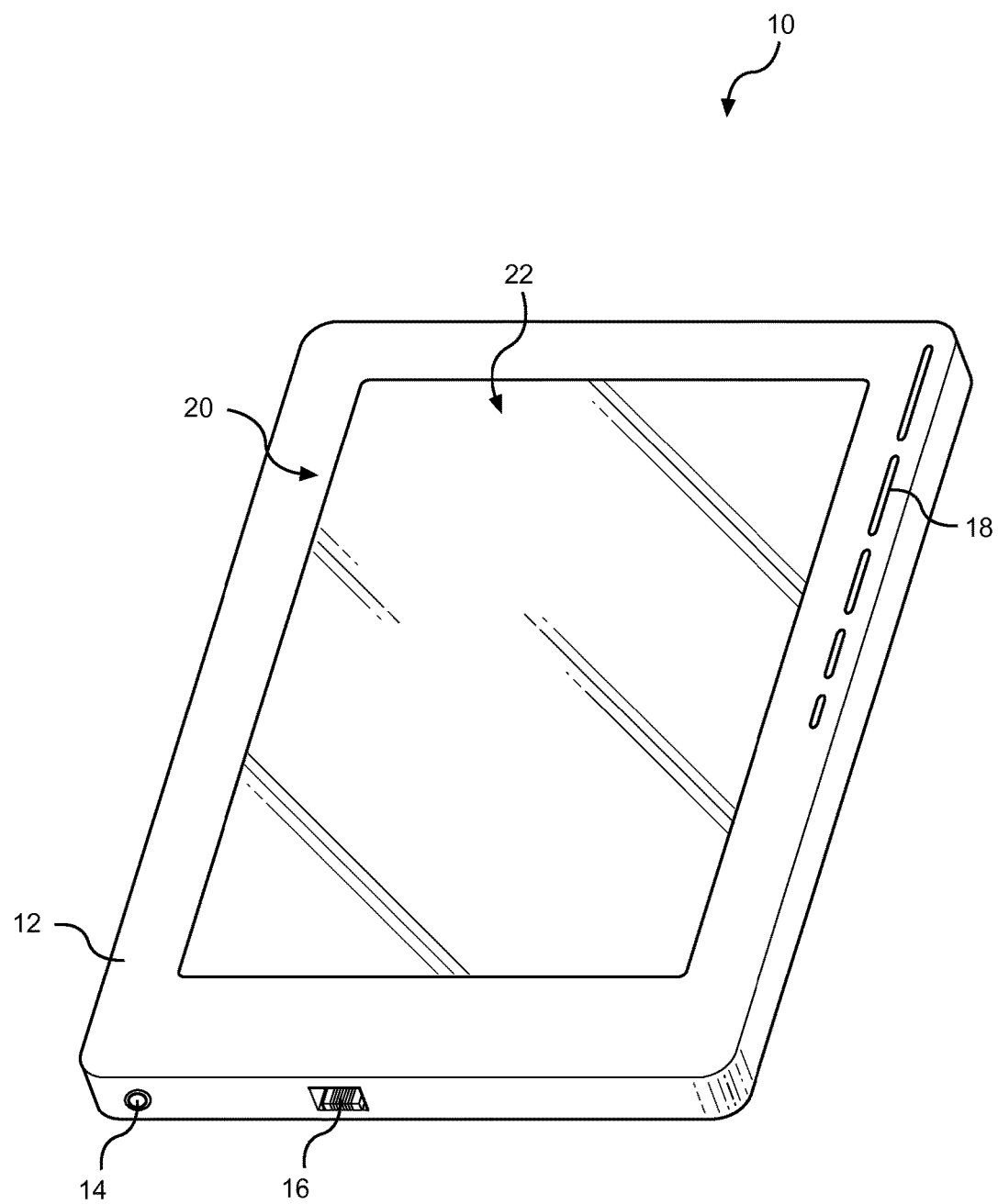
FIG. 1 is a simplified perspective view of an exemplary mobile terminal having multiple power charging options.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include multiple power chargers for mobile terminals. In particularly contemplated aspects, a mobile terminal may include two charging circuits arranged serially, such that only one charging circuit charges a battery of the mobile terminal at a time. The serial arrangement allows consolidation of fuel gauge circuitry within one of the charging circuits. In a particularly contemplated aspect, a second charger is tied to a first charger at a system power node. The system power node is further tied to a top port of the second charger. A bottom port of the second charger is tied to a top port of the first charger. A bottom port of the first charger is tied to the battery of the mobile terminal. The fuel gauge circuitry may sense battery current using a known ON resistance of a field effect transistor (FET) of the first charger.

Aspects of the present disclosure are particularly well suited for use in mobile terminals, although other battery-powered devices may also benefit from concepts disclosed herein. Before addressing exemplary aspects of the charging circuits of the present disclosure, a brief overview of a mobile terminal is provided with reference to FIG. 1. In this regard, FIG. 1 illustrates a mobile terminal 10, which may be a smartphone, tablet, laptop computer, or the like. The mobile terminal 10 includes a housing 12. The housing 12 includes a first power input port 14 and a second power input port 16. The first power input port 14 may be configured to receive a radial power cord, such as is commonly used to plug into a wall outlet. The radial power cord may include an alternating current (AC) to direct current (DC) (AC-DC) converter or transformer, as is well understood, so that power delivered to the first power input port is DC power. The second power input port 16 may be a Universal Serial Bus (USB) port or the like. The mobile terminal 10 may further include a resonator 18 with appropriate inductive and/or capacitive elements (not shown) to allow for wireless charging.

With continued reference to FIG. 1, the mobile terminal 10 may include a user interface 20, which may be a touch screen display 22, speakers (not illustrated), a microphone (not illustrated), a camera (not illustrated), a keypad (not illustrated), or similar elements as is well understood.

Use of the mobile terminal 10 drains a battery within the mobile terminal 10. The battery may be recharged by plugging the mobile terminal 10 into a wall outlet using first power input port 14. As noted above, the radial power cord may include an AC-DC converter or transformer, such that DC power is provided at the first power input port 14. The battery may further be recharged by plugging the mobile terminal 10 into a USB port on another device (e.g., a personal computer, not shown) that is configured to provide power through such USB port. Still further, the battery may be recharged through the resonator 18 using a wireless charging mechanism. Still other charging mechanisms (not shown) may be provided in the mobile terminal 10. Power provided from each charging mechanism passes through a charging circuit (i.e., a charger) where it is conditioned to levels that will not damage elements of the mobile terminal 10 and then provided to the battery. When multiple charging mechanisms are available within the mobile terminal 10, multiple charging circuits may be required. Exemplary aspects of the present disclosure provide techniques to link the charging circuits serially and reuse a fuel gauge within one of the charging circuits, such that space and power may be conserved within the mobile terminal 10.

Figure 2:
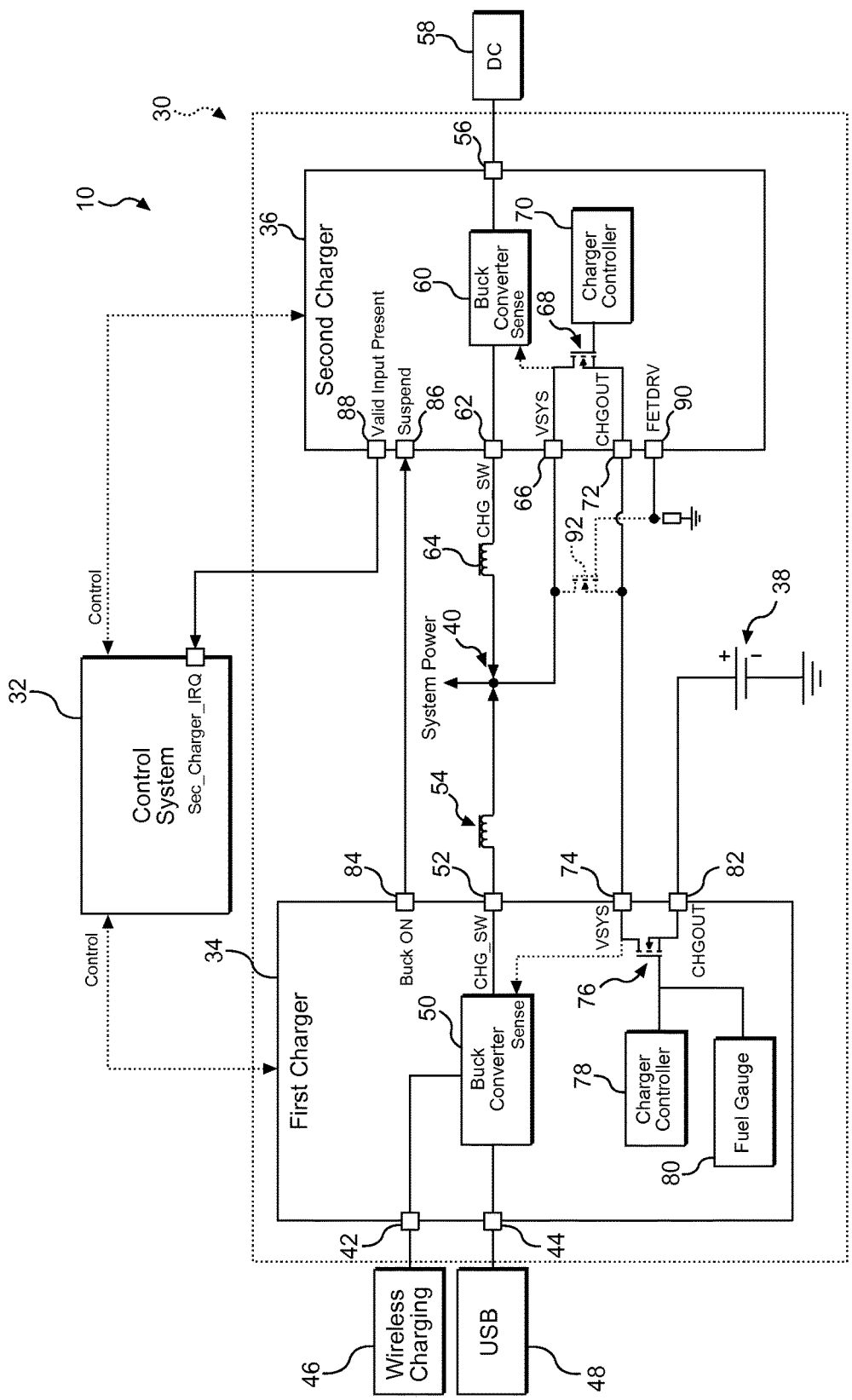
FIG. 2 is a simplified circuit diagram of a charging system of the mobile terminal of FIG. 1, wherein the charging system includes two charging circuits.

In this regard, FIG. 2 illustrates a simplified circuit diagram of a charging system 30 of the mobile terminal 10 of FIG. 1. The charging system 30 is communicatively coupled to a control system 32. In an exemplary aspect, the control system 32 may be a central processing unit (CPU), digital signal processor (DSP), microcontroller unit (MCU), or the like. The charging system 30 includes a first charger (sometimes referred to as a charging circuit) 34 and a second charger (also sometimes referred to as a charging circuit) 36. Note that the terms "first" and "second" are used for convenience in differentiating these elements and no particular order is required. The first charger 34 and the second charger 36 receive power from power inputs and provide the power to a battery 38. The battery 38 and/or chargers 34 and 36 may also provide the power to a system power node 40.

With continued reference to FIG. 2, the first charger 34 includes power input port 42 and power input port 44. The power input port 42 may be coupled to first charging circuitry 46 (which may be a wireless charging circuit including the resonator 18 of FIG. 1 and associated inductive and/or capacitive elements). The power input port 44 may be coupled to second charging circuitry 48 (which may be a USB charging circuit including a USB port, such as the second power input port 16 of FIG. 1).

With continued reference to FIG. 2, the power input ports 42 and 44 are tied to a buck converter 50, which may contain one or more FETs (not shown) that regulate incoming power to a predefined level. The buck converter 50 is tied to a power output port 52 that is coupled to the system power node 40. An inductor 54 may also be present in the link between the power output port 52 and the system power node 40.

With continued reference to FIG. 2, the second charger 36 includes a power input port 56 coupled to third power circuitry 58 (which may be a DC power circuit including the first power input port 14 of FIG. 1). The power input port 56 is coupled to a buck converter 60. The buck converter 60 may include one or more FETs to regulate incoming power to a defined threshold. The output of the buck converter 60 is coupled to a power output port 62. The power output port 62 is also tied to the system power node 40. An inductor 64 may also be present in the link between the power output port 62 and the system power node 40.

With continued reference to FIG. 2, the system power node 40 may provide power to other elements of the mobile terminal 10 including the control system 32, the user interface 20, wireless modems, memory, and the like as is well understood. The system power node 40 is also tied to a second top port 66 on the second charger 36. This second top port 66 is sometimes referred to as VSYS. Within the second charger 36, the second top port 66 provides a sense feedback signal to the buck converter 60. Additionally, the second top port 66 is tied to a FET 68 and through the FET 68 to a charger controller 70. The FET 68 is tied to a second bottom port 72. The second bottom port 72 is sometimes referred to as CHGOUT. Please note that the use of "top" and "bottom" herein are for ease of reference and not intended to imply a particular physical or spatial relationship.

With continued reference to FIG. 2, the second bottom port 72 is tied to a first top port 74 on the first charger 34. The first top port 74 may also be referred to as VSYS. Within the first charger 34, the first top port 74 provides a sense feedback signal to the buck converter 50. Additionally, the first top port 74 is tied to a FET 76 and through the FET 76 to a charger controller 78 and a fuel gauge circuit 80. The FET 76 is also tied to a first bottom port 82. The first bottom port 82 is sometimes referred to as CHGOUT. The first bottom port 82 is tied to the battery 38. Again, the use of "top" and "bottom" are for ease of reference and do not imply a particular physical or spatial relationship.

With continued reference to FIG. 2, the first charger 34 also includes a buck ON port 84 that is tied to a suspend port 86 on the second charger 36. Additionally, the second charger 36 includes a valid input present port 88 that is communicatively coupled to the control system 32. The control system 32 may send control signals to the first charger 34 and the second charger 36 (denoted generally by control lines). In a first aspect, the control lines may be generated by software within the control system 32. In an alternate aspect, the control lines may be implemented in hardware. The second charger 36 may further include a bypass port 90 that is coupled to an optional bypass FET 92. The bypass FET 92 may be active during a discharge period as explained in greater detail below.

It should be appreciated that the first charger 34 may be included in a power management integrated circuit (PMIC), such as, for example, a PMI 8994 sold by QUALCOMM Incorporated of San Diego, Calif. Likewise, the second charger 36 may be, for example, an SMB349 sold by QUALCOMM Incorporated. While the chargers 34 and 36 are conventional, the technique of serially connecting the chargers according to exemplary aspects of the present disclosure provides advances over prior multi-charging circuit solutions. While illustrated as the first charger 34 servicing the first charging circuitry 46 and the second charging circuitry 48, it should be appreciated that other charging circuits may exist in place thereof. Further, while the first charger 34 is shown having only two inputs, it should be appreciated that the first charger 34 may have more power inputs. Likewise, the second charger 36 may serve more power inputs than just the third power circuitry 58.

Figure 4:
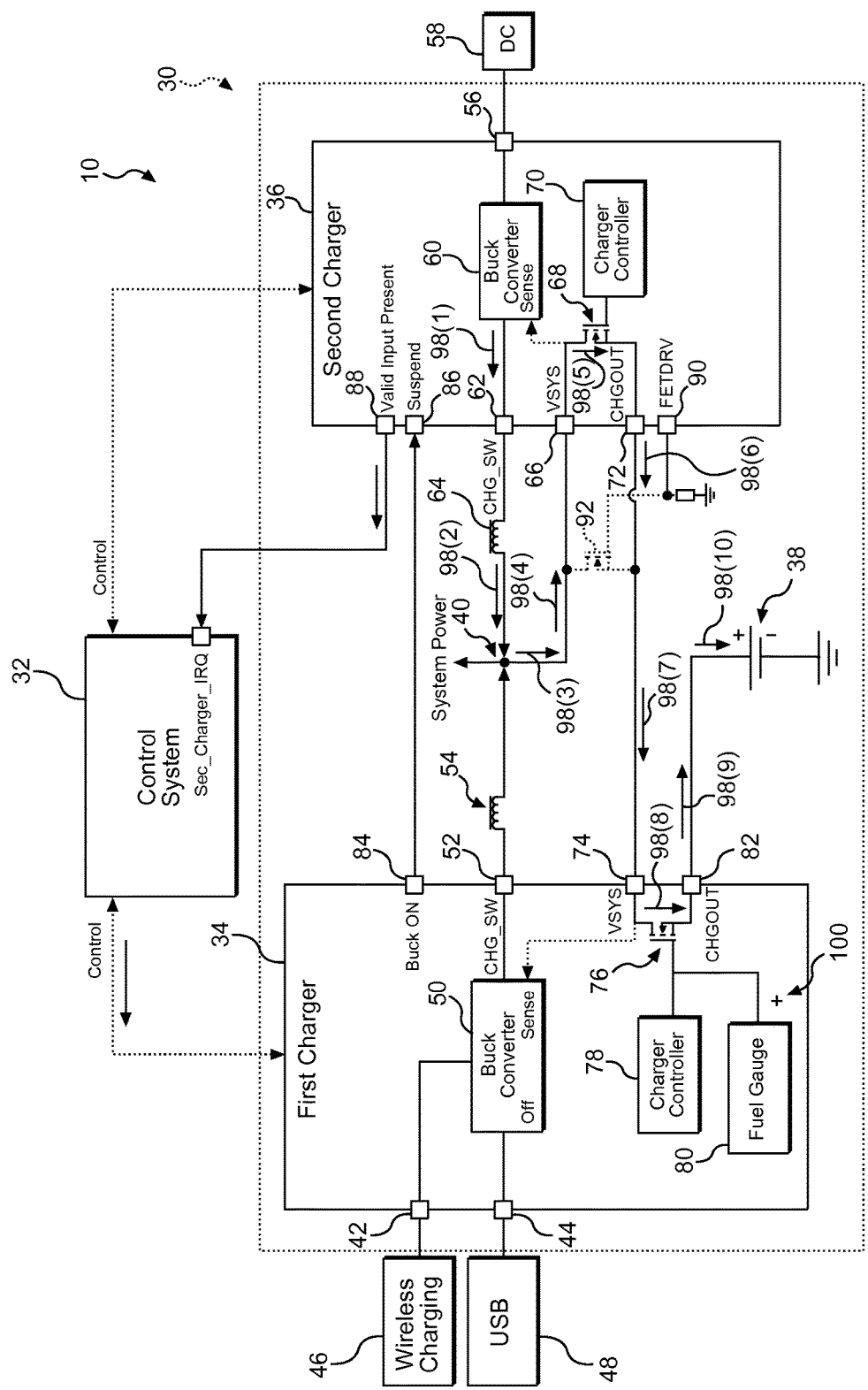
FIG. 4 is the charging system of FIG. 2 with a charging path of the second charger illustrated.
Figure 5:
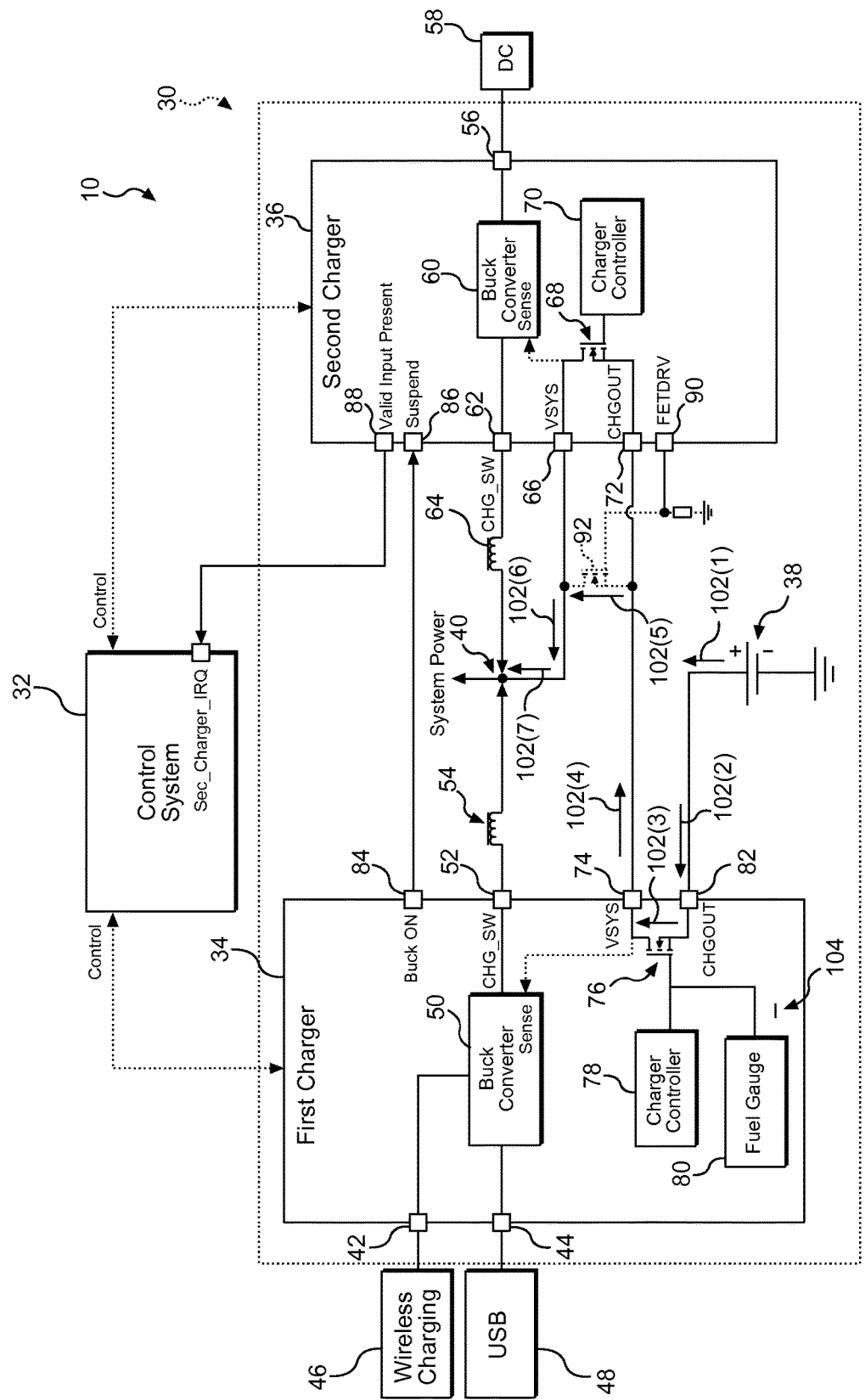
FIG. 5 is the charging system of FIG. 2 illustrating a discharge state.

In use, the charging system 30 receives power from one of the charging circuits (e.g., the first charging circuitry 46, the second charging circuitry 48, or the third power circuitry 58). The first charger 34 or the second charger 36 that receives the power causes the other charger (34 or 36) to deactivate and the power passes to the battery 38 in such a fashion that the fuel gauge circuit 80 can track how much current has been coming in and out of the battery 38. When the mobile terminal 10 is in a discharge state, the current flows from the battery 38 past the fuel gauge circuit 80 to the system power node 40. The various states are illustrated in FIGS. 3-5.

Figure 3:
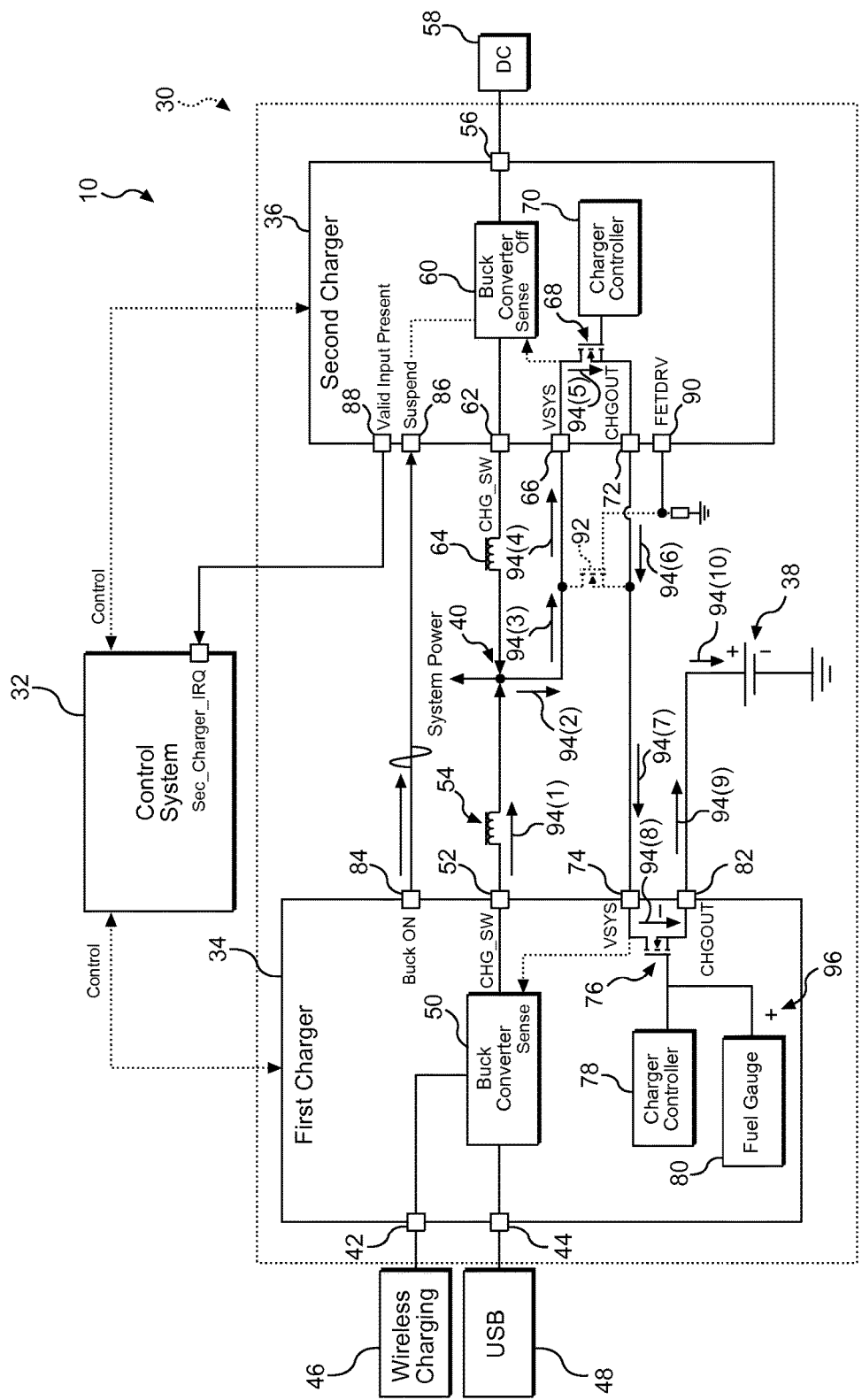
FIG. 3 is the charging system of FIG. 2 with a charging path of the first charger illustrated.

In this regard, FIG. 3 illustrates the mobile terminal 10 when the first charger 34 is coupled to a power source (e.g., a wireless charging source or USB charging source). The first charger 34 asserts a buck ON signal at the buck ON port 84. The buck ON signal is implemented in hardware and is asserted without software intervention. This asserted signal is received at the suspend port 86 of the second charger 36 and the buck converter 60 is turned off. The power flows from the power output port 52 as indicated by power flow signal 94(1). Power may be consumed by the mobile terminal 10 at the system power node 40, but also continues to the second top port 66 as indicated by power flow signals 94(2)-94(4). The power flows through the FET 68 as indicated by power flow signal 94(5) and out the second bottom port 72 to the first top port 74 as indicated by power flow signals 94(6) and 94(7). The power goes from the first top port 74 across the FET 76 as indicated by power flow signal 94(8) to the first bottom port 82. As the power flows across the FET 76, the fuel gauge circuit 80 registers an increase in capacity for the battery 38 as indicated by plus 96. The power exits the first bottom port 82 and travels to the battery 38 to charge the battery 38 as indicated by power flow signals 94(9) and 94(10). This process is illustrated as a flowchart with reference to FIG. 6 below.

Similarly, if the power is present at the second charger 36 (e.g., the mobile terminal 10 is plugged into a wall outlet), the second charger 36 is active and the first charger 34 is inactive. FIG. 4 illustrates this charging state. The power flows from the buck converter 60 to the system power node 40 as indicated by power flow signals 98(1) and 98(2). Power may be consumed by the mobile terminal 10 at the system power node 40, but also continues to the second top port 66 as indicated by power flow signals 98(3) and 98(4). The power flows through the FET 68 as indicated by power flow signal 98(5) and out the second bottom port 72 to the first top port 74 as indicated by power flow signals 98(6) and 98(7). The power goes from the first top port 74 across the FET 76 as indicated by power flow signal 98(8) to first bottom port 82. As the power flows across the FET 76, the fuel gauge circuit 80 registers an increase in power for the battery 38 as indicated by plus 100. The power exits the first bottom port 82 and travels to the battery 38 to charge the battery 38 as indicated by power flow signals 98(9) and 98(10). This process is illustrated as a flowchart below with reference to FIG. 7.

Note that it is possible that more than one power source may be provided concurrently. In such an instance, absent control, both the buck converters 50 and 60 may be activated, creating what is sometimes called a "buck fight." Buck fights have the ability to create too much current in the circuitry and/or damage the elements of the mobile terminal 10 and are something to be avoided. To avoid such a condition, aspects of the present disclosure provide an initial fail-safe mechanism in the buck ON signal, which suspends the second charger 36. Priorities between the chargers may be implemented in software provided by the control system 32 to select between the different power sources and/or override the hardware default of the buck ON signal. For example, power from a wall outlet may be preferred over USB power. Accordingly, if the second charger 36 indicates that there is power at the second charger 36 to the control system 32, the control system 32 may deactivate the first charger 34 regardless of whether there is power at the first charger 34. In such an instance, the buck ON signal is not asserted at the buck ON port 84. Other priority techniques are also within scope of the present disclosure.

In contrast to the charging states illustrated in FIGS. 3 and 4, FIG. 5 illustrates a discharge state. Power flows from the battery 38 to the first bottom port 82 as indicated by power flow signals 102(1) and 102(2). The power flows across the FET 76 to the first top port 74 as indicated by power flow signal 102(3). As the power flows across the FET 76, the fuel gauge circuit 80 reflects current discharge as indicated by minus 104. The power leaves the first top port 74 and flows to the bypass FET 92 as indicated by power flow signals 102(4) and 102(5). From the bypass FET 92, the power flows to the system power node 40 as indicated by power flow signals 102(6) and 102(7). Elements of the mobile terminal 10 may then use the power provided at the system power node 40.

The serially connected chargers 34 and 36 allow for consolidation of certain elements within the chargers 34 and 36. For example, only a single fuel gauge circuit, such as the fuel gauge circuit 80, is present. Likewise, space utilization may be reduced by such an arrangement. Still further, this arrangement insures that internal charging current monitoring systems of each of the chargers 34 and 36 see the correct current flowing to the battery 38.

Figure 6:
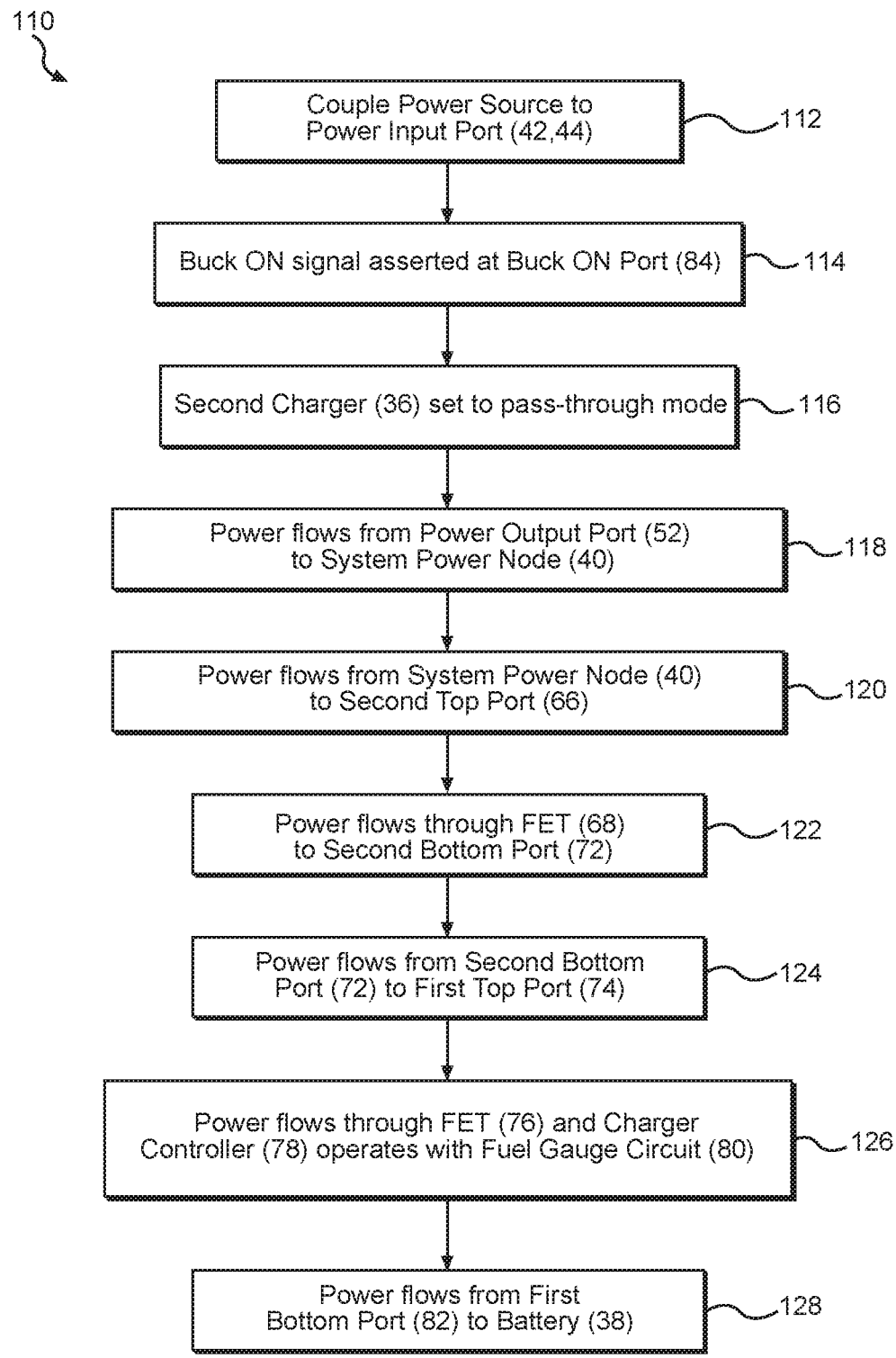
FIG. 6 is a flowchart illustrating an exemplary process for charging with the first charger.
Figure 7:
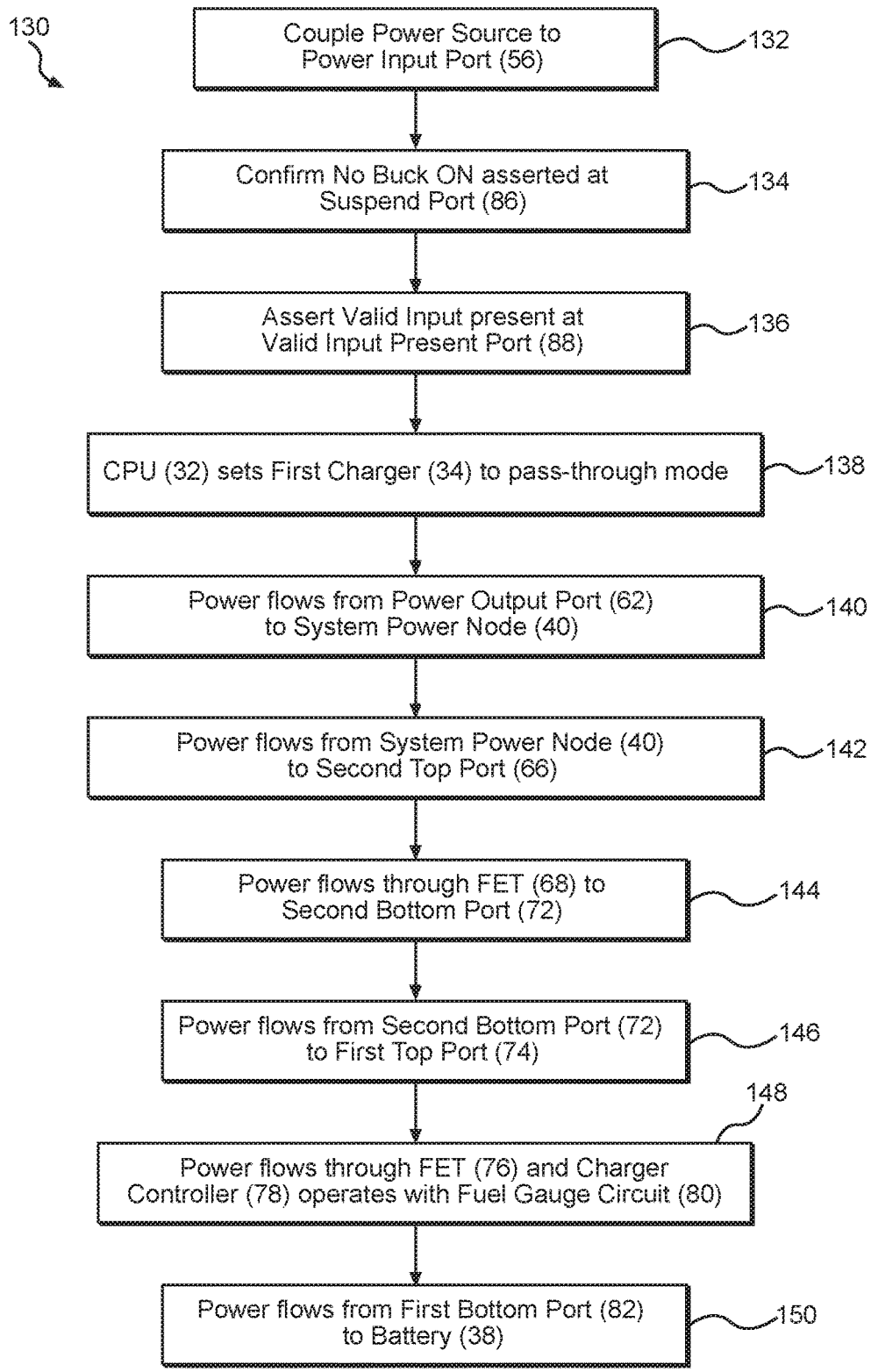
FIG. 7 is a flowchart illustrating an exemplary process for charging with the second charger.

While FIGS. 4 and 5 illustrate the hardware configurations for exemplary aspects of the present disclosure, FIGS. 6 and 7 are provided to illustrate processes associated with exemplary aspects of the present disclosure. In particular, FIG. 6 illustrates process 110 corresponding to charging the battery 38 through either the power input port 42 or the power input port 44. Thus, the process 110 begins when a power source is coupled to either the power input port 42 or the power input port 44 (block 112). The first charger 34 causes the buck ON signal to be asserted at the buck ON port 84 (block 114). The second charger 36 is set to a pass-through mode (block 116) on detection of the buck ON signal at the suspend port 86. The power flows from the buck converter 50 to the power output port 52 and from the power output port 52 to the system power node 40 (block 118).

With continued reference to FIG. 6, the power flows from the system power node 40 to the second top port 66 (block 120). The power passes through the second charger 36 by passing through FET 68 and to the second bottom port 72 (block 122). The power flows from the second bottom port 72 to the first top port 74 (block 124). The power flows through the FET 76, and the charger controller 78 operates with the fuel gauge circuit 80 (block 126) as the power flows from the first bottom port 82 to the battery 38 (block 128).

A similar process 130 exists for when the battery 38 is charged through the power input port 56. Thus, the process 130 begins when a power source is coupled to the power input port 56 (block 132). The second charger 36 confirms that no buck ON signal is asserted at the suspend port 86 (block 134). If the buck ON signal is asserted at the suspend port 86, the second charger 36 is placed into a pass-through mode as explained above and the process 130 ends. Absent the buck ON signal at the suspend port 86 and with the power source at the power input port 56, the second charger 36 asserts a valid input present at the valid input present port 88 (block 136).

With continued reference to FIG. 7, the control system 32 sets the first charger 34 to the pass-through mode (block 138). The power flows from the power output port 62 to the system power node 40 (block 140). The power flows from the system power node 40 to the second top port 66 (block 142). The power passes through the second charger 36 by passing through the FET 68 and to the second bottom port 72 (block 144). The power flows from the second bottom port 72 to the first top port 74 (block 146). The power flows through the FET 76, and the charger controller 78 operates with the fuel gauge circuit 80 (block 148) as the power flows from the first bottom port 82 to the battery 38 (block 150).

The present disclosure uses words like "coupled to," "tied to," "communicatively coupled," "operatively coupled," "connected to," and the like. It should be appreciated that such terms imply a physical connection, which may be direct or indirect. Further, while communications and power transfers are possible through wireless coupling, such wireless coupling is specifically excluded from these terms.

While particularly contemplated for mobile computing devices, such as the mobile terminal 10, the multiple power chargers according to aspects disclosed herein may be provided in or integrated into any battery-based processor-based device. Examples, without limitation, include: a set top box, an entertainment unit, a navigation device, a communications device, a fixed location data unit, a mobile location data unit, a mobile phone, a cellular phone, a smartphone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 8:
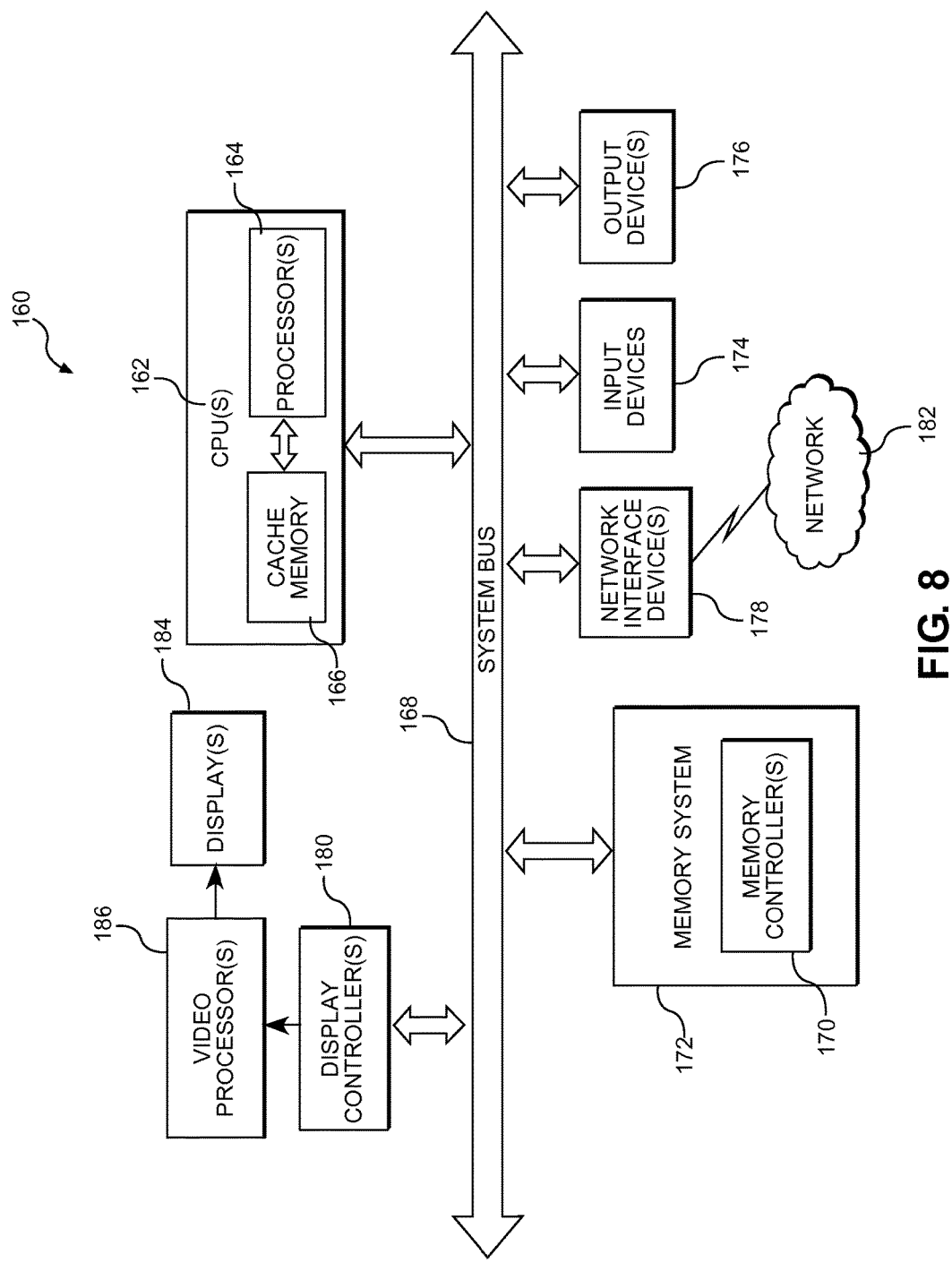
FIG. 8 is a block diagram of a generic exemplary processor-based system that can include the charging circuits of FIG. 2.

In this regard, FIG. 8 illustrates an example of a processor-based system 160 that can employ the charging system 30 illustrated in FIG. 2. In this example, the processor-based system 160 includes one or more CPUs 162, each including one or more processors 164. The CPU(s) 162 may include the control system 32. The CPU(s) 162 may have cache memory 166 coupled to the processor(s) 164 for rapid access to temporarily stored data. The CPU(s) 162 is coupled to a system bus 168 and can intercouple devices included in the processor-based system 160. As is well known, the CPU(s) 162 communicates with these other devices by exchanging address, control, and data information over the system bus 168. For example, the CPU(s) 162 can communicate bus transaction requests to a memory controller 170 as an example of a slave device.

Other devices can be connected to the system bus 168. As illustrated in FIG. 8, these devices can include a memory system 172, one or more input devices 174, one or more output devices 176, one or more network interface devices 178, and one or more display controllers 180, as examples. The input device(s) 174 can include any type of input device, including, but not limited to, input keys, switches, voice processors, etc. The output device(s) 176 can include any type of output device, including, but not limited to, audio, video, other visual indicators, etc. The network interface device(s) 178 can be any device configured to allow exchange of data to and from a network 182. The network 182 can be any type of network, including, but not limited to, a wired or wireless network, a private or public network, a local area network (LAN), a wide area network (WAN), a wireless local area network (WLAN), and the Internet. The network interface device(s) 178 can be configured to support any type of communications protocol desired.

The CPU(s) 162 may also be configured to access the display controller(s) 180 over the system bus 168 to control information sent to one or more displays 184. The display controller(s) 180 sends information to the display(s) 184 to be displayed via one or more video processors 186, which process the information to be displayed into a format suitable for the display(s) 184. The display(s) 184 can include any type of display, including, but not limited to, a cathode ray tube (CRT), a liquid crystal display (LCD), a light emitting diode (LED) display, a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a DSP, an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A charging system comprising:
   a first charger comprising:
   a first power output electrically tied to a system power node;
   a first top port;
   a first bottom port; and
   a fuel gauge circuit electrically tied to the first top port; and
   a second charger comprising:
   a second power output electrically tied to the system power node;
   a second top port electrically tied to the system power node; and
   a second bottom port electrically tied directly to the first top port of the first charger.

2. The charging system of claim 1, further comprising a battery, the battery tied to the first bottom port of the first charger.

3. The charging system of claim 1, wherein the first charger comprises a buck converter providing power to the first power output.

4. The charging system of claim 1, wherein the second charger comprises a buck converter providing power to the second power output.

5. The charging system of claim 1, wherein the first charger comprises a Universal Serial Bus (USB) power input.

6. The charging system of claim 1, wherein the first charger comprises a wireless charging power input.

7. The charging system of claim 1, wherein the first charger comprises a portion of a power management integrated circuit (PMIC).

8. The charging system of claim 1, wherein the second charger comprises a direct current (DC) power source input.

9. The charging system of claim 1, further comprising a bypass field effect transistor (FET) tying the system power node to the first top port.

10. The charging system of claim 1, wherein the first charger comprises a buck ON port configured to provide a signal to the second charger when power is provided to a power input of the first charger.

11. A connection fabric comprising:
    a first connection configured to be electrically tied to a first power port on a first charger and a system power node;
    a second connection configured to be electrically tied to a second power port on a second charger and the system power node;
    a third connection electrically tied to the system power node and configured to be electrically tied to a second top port of the second charger;
    a fourth connection configured to be electrically tied directly between a second bottom port of the second charger and a first top port of the first charger; and
    a fifth connection configured to be electrically tied to a first bottom port of the first charger and a battery.

12. The connection fabric of claim 11, further comprising a buck ON connection configured to tie a buck ON port of the first charger to a suspend port on the second charger.

13. The connection fabric of claim 11, further comprising a bypass field effect transistor (FET) tying the third connection to the fourth connection.

14. The connection fabric of claim 13, further comprising a FET driver connection configured to couple the bypass FET to the second charger.

* * * * *